(12) United States Patent
Natarajan

(10) Patent No.: US 8,832,776 B1
(45) Date of Patent: Sep. 9, 2014

(54) PROGRAMMABLE MICRO-CORE PROCESSORS FOR SECURITY PROCESSING

(75) Inventor: Revathi Natarajan, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 55 days.

(21) Appl. No.: 13/164,565

(22) Filed: Jun. 20, 2011

(51) Int. Cl.
G06F 21/00 (2013.01)

(52) U.S. Cl.
USPC .................................................. 726/1; 726/2

(58) Field of Classification Search
CPC .... H04L 63/102; H04L 63/20; G06F 21/6218
USPC ............................................................ 726/1
See application file for complete search history.

(56) References Cited

U.S. PATENT DOCUMENTS

| | | | | |
|---|---|---|---|---|
| 2003/0140205 | A1* | 7/2003 | Dahan et al. | 711/163 |
| 2007/0189526 | A1* | 8/2007 | Davidson | 380/44 |
| 2009/0106555 | A1* | 4/2009 | Buer | 713/176 |
| 2010/0100749 | A1* | 4/2010 | Gerber et al. | 713/193 |

* cited by examiner

Primary Examiner — Kambiz Zand
Assistant Examiner — Ghodrat Jamshidi
(74) Attorney, Agent, or Firm — Sterne, Kessler, Goldstein & Fox P.L.L.C.

(57) ABSTRACT

A security processing system includes one or more micro-cores that can operate in conjunction with one or more security cores to process packets. The micro-core can perform any suitably programmed tasks upon packets, such as encryption/decryption and authentication tasks. The combination of having both the hard-coded security engines and the programmable micro-core within the same system permits the security system to effectively obtain the benefit of the speed and performance advantages of having dedicated security hardware, in addition to the flexibility and expandability of being able to use a programmable micro-core.

20 Claims, 10 Drawing Sheets

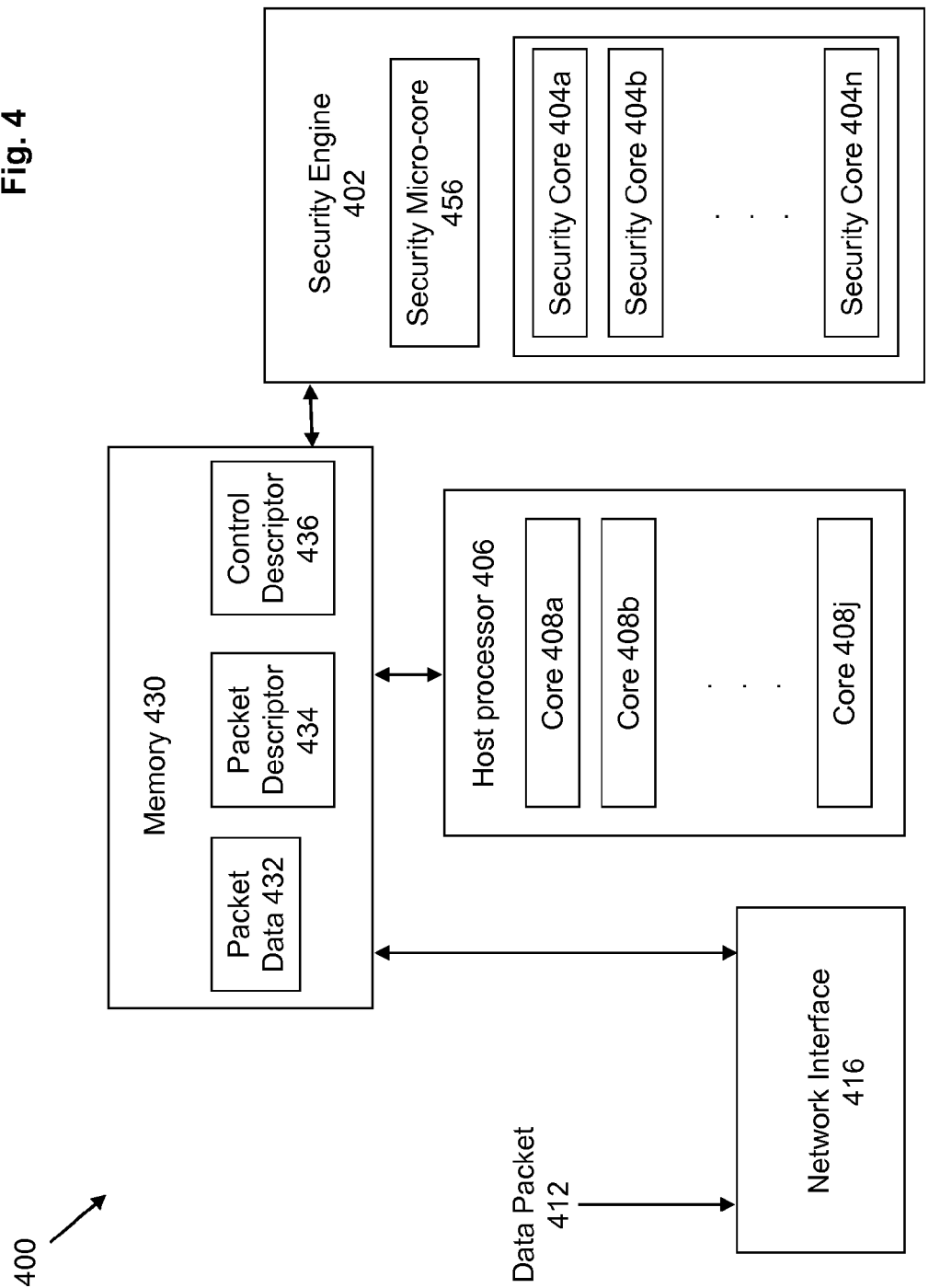

_US 8,832,776 B1_

PROGRAMMABLE MICRO-CORE PROCESSORS FOR SECURITY PROCESSING

FIELD

The present disclosure is directed towards circuits for security processing.

BACKGROUND

Today's networking components process numerous different flows (e.g. groups of packets originating from a common source) for implementing security and threat management. As time progresses, the speed at which networking components operate increases, and accordingly the rate at which security and threat management needs to operate also increases. In some cases, a security and threat management operation might be processed in batches (e.g. by storing the packets of a flow, and later processing the stored packets), and in other cases it is desirable to process the security and threat management operation at wire speed.

To increase the speed that security and threat management can be performed in a system, security processing is often handled in hardware by using dedicated security circuits. This permits faster operations by offloading security functions from a general processor to the specialized cores for the security-related functions. These specialized cores are hard-coded to perform defined sets of security functionality for defined sets of security protocols.

Accordingly, there is a need for an improved approach to implement security processing which possess the performance and speed of using a hardware-based security processing system, but which is flexible enough to be expandable in its scope of functionality.

SUMMARY

An approach is described to implement a security processing system that includes one or more micro-cores that can operate in conjunction with one or more security cores to process packets. In some embodiments, the micro-core can perform any suitably programmed tasks upon packets, such as encryption/decryption and authentication tasks. This means that the micro-core can be configured to handle any protocol and processing needs without re-design of the hardware of the security system, even for protocols and processing needs that did not exist at the time of deployment for the security system. The combination of having both the hard-coded security engines and the micro-core within the same system permits the security system to effectively obtain the benefit of the speed and performance advantages of having dedicated security hardware, in addition to the flexibility and expandability of being able to use a programmable micro-core.

Other and additional objects, features, and advantages are described in the detailed description, figures, and claims.

BRIEF DESCRIPTION OF THE DRAWINGS

FIG. 4 illustrates an example processing system that can be used to implement a system for security processing that includes a micro-core in conjunction with security engines.

DETAILED DESCRIPTION

Embodiments will now be described in detail with respect to the drawings, which are provided as illustrative examples. Notably, the figures and examples below are not meant to limit the scope of the disclosure to a single embodiment, but other embodiments are possible by way of interchange of some or all of the described or illustrated embodiments. Whenever convenient, the same reference numbers will be used throughout the drawings to refer to the same or like parts. Where certain elements of these embodiments can be partially or fully implemented using known components, only those portions of known components that are necessary for understanding of the embodiment will be described, and detailed descriptions of other portions of such known components will be omitted so as to not obscure the description. In the present specification, an embodiment showing a singular component should not be considered to be limiting; rather, the disclosure is intended to encompass other embodiments including a plurality of the same components, and vice versa, unless explicitly stated otherwise. Further, the present disclosure encompasses present and future known equivalents to the components referred to by way of illustration.

An approach is described to implement security processing for networking systems, where the security processing system includes one or more micro-cores that can operate in conjunction with one or more security cores (e.g., hard-coded cores) to process packets in the networking system. The micro-core can perform any suitably programmed tasks upon packets, such as encryption/decryption and authentication tasks. This means that the micro-core can be configured to handle any protocol and processing needs without re-design of the hardware of the security system, even for protocols and processing needs that did not exist at the time of deployment for the security system. The combination of having both the hard-coded security engines and the micro-core within the same system permits the security system to effectively obtain the benefit of the speed and performance advantages of having the dedicated security hardware, in addition to the flexibility and expandability of being able to expand and add additional processing functionality.

Figure 1:
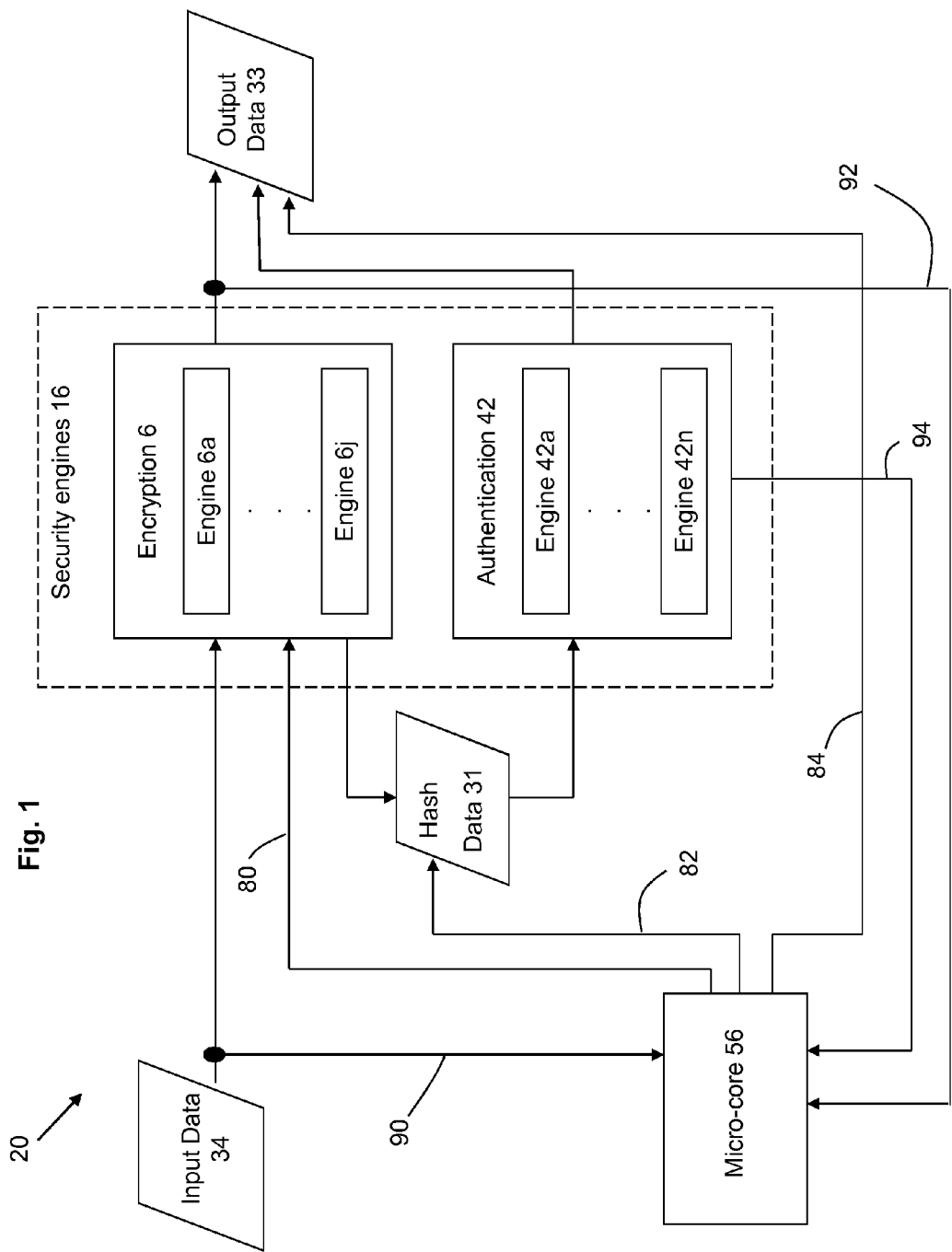
FIG. 1 shows a system for security processing that is implemented with a micro-core in conjunction with security engines in accordance with some embodiments.

FIG. 1 shows a system 20 for performing security processing that includes both hard-coded security engines 16 as well as a programmable micro-core 56 (also referred to herein as a "μcore"). The hard-coded security engines 16 are circuits that are dedicated for performing pre-configured security operations upon packet input data 34 in order to generate output data 33. As such, these hard-coded security engines 16 can perform predefined security-related tasks very quickly and efficiently, by performing these tasks in place of a general purpose processor (or the general purpose processor cores within a multi-core processor).

The hard-coded security engines 16 can be designed to perform any security functions that may be configured into their circuitry. For example, hard-coded security engines 16 may include encryption circuitry 6 having a set of one or more encryption engines 6a-j, where each of the encryption engines 6a-j pertains to processing for a different encryption protocol. The hard-coded security circuit 16 may also include authentication circuitry 42 having a set of one or more authentication engines 42*a-n*, where each of the authentication engines 42*a-n* pertains to processing for a different authentication protocol. The encryption circuitry 6 may generate a hash data 31 and provide the hash data 31 to the authentication circuitry 42, where the hash data 31 comprises one or more key values that may be needed by the authentication engines 42*a-n* to perform user, session or packet authentication tasks.

System 20 further includes a micro-core 56 in combination with the hard-coded security engines 16. The micro-core 56 can be programmably configured to perform security-related operations in the system 20 in combination with functionality performed by the hard-coded security engines 16. The micro-core 56 is a very small footprint microprocessor that is localized to the security system 20. In some embodiments, the micro-core 56 only has access to local resources so that the execution latency is deterministic, where the instruction RAM, data/stack RAM, and packet RAM are all local to the micro-core 56, and where the micro-core 56 does not have access to off-chip resources or other accelerators that can make per-packet execution latency unpredictable. The micro-core 56 is distinguishable from a general purpose processor or from the core within a typical multi-core processor because of its small footprint and localized positioning and access to resources.

The micro-core 56 is not logically fixed at a single position in the data flow of system 20 to perform its security processing. Instead, the micro-core 56 can logically operate at various different positions within the flow of system 20 to perform security processing. For example, the micro-core 56 may operate by providing an input through line 80 to the encryption circuitry 6. The micro-core 56 may also operate at a further position in the flow of system 20, by providing the hash data 31 through line 82 to the authentication circuitry 42. The micro-core 56 may also operate even further along the flow of system 20, by directly providing the output data 33 through line 84. As inputs, the micro-core 56 may be configured to receive input data from any part of system 20. For example, the micro-core may directly receive the input data 34 along line 90. The micro-core 56 may also receive data from the encryption circuitry 16 on line 92. In addition, the output of the authentication circuitry 42 may be provided to the micro-core 56 on line 94.

The micro-core 56 may be associated with a memory structure (e.g., an instruction cache) to hold instructions to program and operate micro-core 56. The input data 34 may contain information that determine the specific programmed functions to be performed by the micro-core 56, and the logical positioning of the micro-core 56 within system 20 for performing those functions. Control registers may also provide instructions to various multiplexers within system 20 (not shown for simplicity; see, for example, FIG. 2) for controlling the flow of control and payload data between the micro-core 56 and the hard-coded security engines 16 in system 20.

It is this configurable variability by the micro-core 56 in its relative logical positioning within system 20 that allows micro-core 56 to operate with enough adaptability to handle current or future operating need of system 20. This is because the micro-core 56, as noted above, can be programmed to access data anywhere within system 20, to operate upon that data as desired, and then to inject the processed data anywhere within the data flows of system 20. This inclusion of micro-core 56 into system 20 therefore allows the system 20 to be flexible enough to be programmed to handle future needs of the system 20. For example, the micro-core 56 can be configured to handle protocol and processing needs of the user without re-design of the hardware of system 20, even if those protocols and processing needs were not currently known at the time of deployment for the system 20 and thus cannot be handled by security engines 6*a-6j* and/or 42*a-42n* alone. This approach also allows the system 20 to address and implement bug-fixes for problems that may be discovered in the future for the design of system 20.

In addition, the combination of having both the hard-coded security engines 16 and the micro-core 56 within the same system 20 permits the system 20 to effectively maintain the speed and performance advantages of prior approaches that only utilize dedicated security hardware. This because a significant portion of the normal operations to be performed by system 20 is likely to be standard operations that have been designed into the functionality of the hard-coded security engines 16, and hence can still be efficiently and quickly performed by the hard-coded security engines 16. In some embodiments, only functionality that is not designed into the hard-coded security engines 16 would be processed by the micro-core 56.

Figure 2:
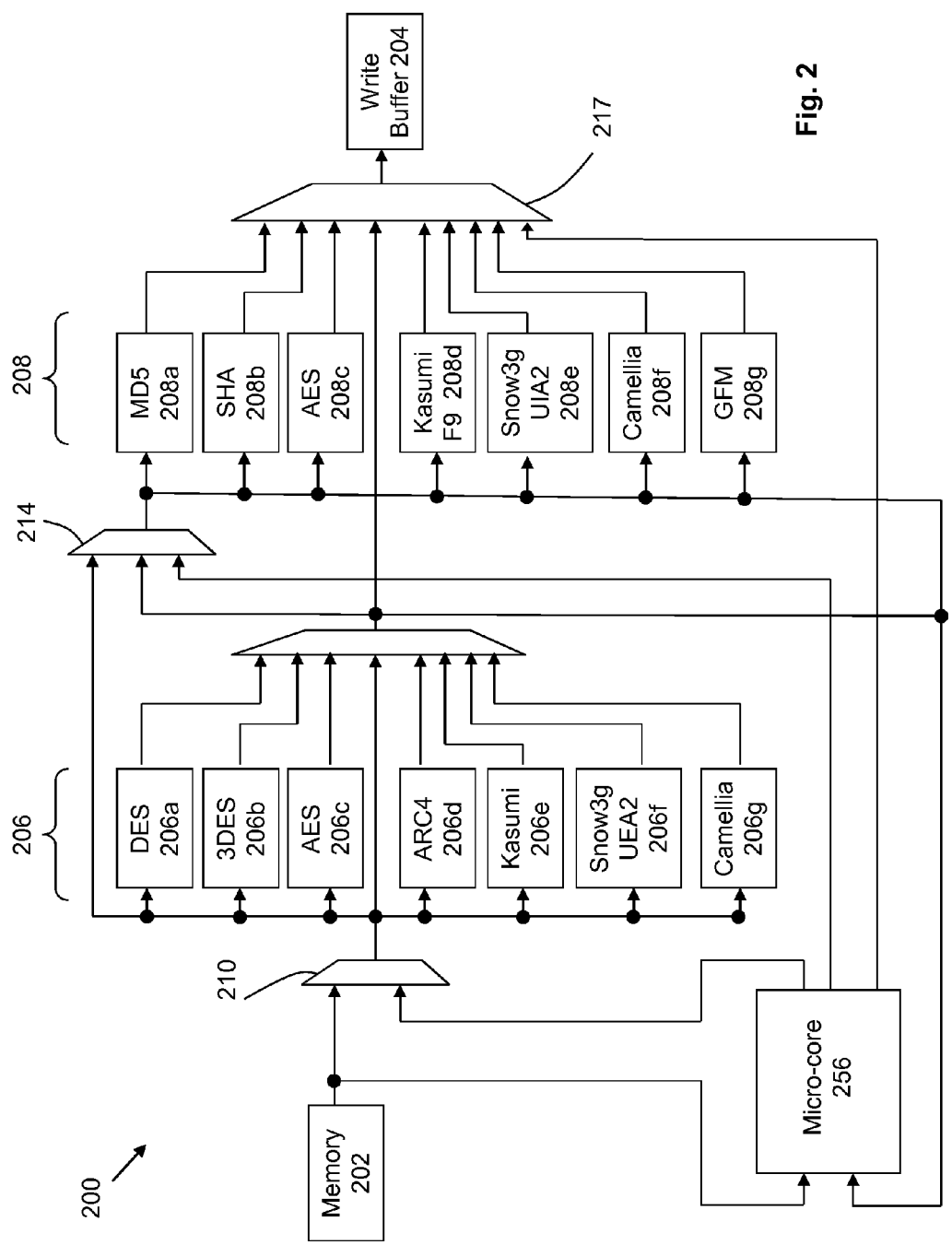
FIG. 2 illustrates further details regarding a system for security processing that is implemented with a micro-core in conjunction with security engines in accordance with some embodiments.

FIG. 2 shows a more detailed diagram of a security system 200, which is an example of the system 20 according to some embodiments. The security system 200 can provide flexible encryption/decryption and authentication hashing-related acceleration support within a processing or networking system.

The security system 200 contains multiple encryption/authentication cores that are hard-coded to handle industry-standard security protocols. The multiple encryption/authentication cores are organized into two groupings, including the crypto/cipher cores 206 and the authentication cores 208.

The crypto/cipher cores 206 allow for a host CPU, processor, or processor core to offload encryption/decryption functionality to the crypto/cipher cores 206 for maximum performance, since this approach minimizes the number of cycles needed in the host CPU, processor, or processor core to perform encryption/decryption. The crypto/cipher cores 206 may implement functionality for a plurality of respective encryption protocols or formats. For example, encryption core 206*a* is configured to perform DES (data encryption standard) processing, core 206*b* is configured to perform 3DES processing, core 206*c* is configured to perform AES (advanced encryption standard) processing, core 206*d* is configured to perform ARC4 processing, core 206*e* is configured to perform KASUMI (F8 format for 3GPP mobile communications) processing, core 206*f* is configured to perform SNOW3G (UEA2 format for 3GPP mobile communications) processing, and core 206*g* is configured to perform CAMELLIA processing.

The authentication cores 208 allow for a host CPU, processor, or processor core to offload authentication and hashing operations to the authentication cores 208. The authentication cores 208 may implement functionality for a plurality of respective authentication protocols or related hashing operations. For example, authentication core 208*a* is configured to perform MD5 (message digest algorithm 5) processing, authentication core 208*b* is configured to perform SHA (secure hash algorithm) processing, authentication core 208*c* is configured to perform AES (message authentication code algorithm) processing, authentication core 208*d* is configured to perform KASUMI F9 processing, authentication core 208*e* is configured to perform SNOW3G UIA2 processing, authentication core 208*f* is configured to perform CAMELLIA processing, and authentication core 208*g* is configured to perform GFM (galois field multiplier) processing.

The micro-core 256 can logically operate at different positions within the flow of system 200. For example, the micro-core 256 may be operable to provide input data to the crypto/cipher cores 206. A mux 210 is controllable to determine whether the crypto/cipher cores 206 receives input from memory 202 or whether the crypto/cipher cores 206 receive input from the micro-core 256. Similarly, the micro-core 256 is operable to provide input data to the authentication core 208. A mux 214 is controllable to determine whether the authentication cores 206 receive input from memory 202, from the crypto/cipher cores 206, or from the micro-core 256. The micro-core 256 is also operable to provide the output that is written to the write buffer 204. A mux 217 controls whether the output that is written to the write buffer 204 is received from the crypto/cipher cores 206, the authentication cores 208, or the micro-core 216.

Depending upon the requirements of a given security application, the combination of the crypto/cipher cores 206, authentication cores 208, and/or the micro-core 256 can operate to encrypt/authenticate a packet, or authenticate and decrypt a packet, in a single pass within system 200. The input packet data is read from a memory 202, where the input packet data comprises any combination of control data and payload data that may be used to perform security-related functionality in system 200. For example, the encryption/hashing algorithm that is selected for processing on a packet may be determined by a control descriptor that is part of the input data from memory 202. The function of the micro-core 256 in the system 200 may also be controlled by the control descriptor.

In some embodiments, a security acceleration engine may be implemented having multiple parallel security pipes, each of which includes various encryption/authentication cores are described above. For example, a security acceleration engine may be implemented having twelve security pipes as shown in the system 200 of FIG. 2.

In terms of process flow, the micro-core is operable at any relative position within the security system 200 in conjunction with the hardcoded crypto/cipher cores 206 and authentication cores 208. FIGS. 3A-F show examples of different data flow configurations that may be implemented through various combinations of the micro-core 256, crypto/cipher cores 206, and authentication cores 208.

Figure 3A:
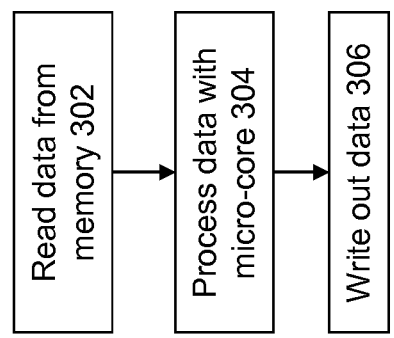
FIG. 3A-F illustrate example data flows within a security system that may be implemented with a micro-core.

FIG. 3A illustrates a flow in which the micro-core 256 performs security processing by itself, bypassing the crypto/cipher cores 206 and the authentication cores 208. This flow may be taken, for example, to handle a given algorithm (e.g., an after-developed algorithm) that does not correspond to the algorithms or protocols represented by the crypto/cipher cores 206 or the authentication cores 208.

At 302, the input data is obtained from memory, including, for example, the control data and the packet payload data. The control data contains information to control the security system to implement the requested algorithms with the micro-core, and to bypass the hardcoded cores within the system. Therefore, at 304, the micro-core will perform the required processing on the packet payload data. The output from the micro-core will be written out, at 306, to the write buffer.

Figure 3B:
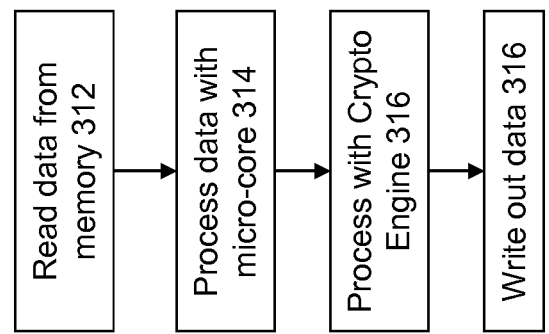

FIG. 3B illustrates a flow in which the micro-core 256 performs security processing in conjunction with the hardcoded crypto/cipher cores 206, while bypassing the authentication cores 208. The approach of FIG. 3B may be taken, for example, to execute pre-processing on the input packet data before being encrypted or decrypted by the crypto/cipher cores.

At 312, the input data is obtained from memory, including, for example, the control data and the packet payload data. The control data contains information to control the security system to instruct the micro-core to initially read and process the payload, and to then feed the output from the micro-core to the crypto/cipher cores while bypassing the hardcoded authentication cores. At 314, the micro-core will perform the required processing on the packet payload data, generating an output which is then sent to the crypto/cipher cores. At 316, the data is processed by the appropriate core within the crypto/cipher cores. The control data from memory is used to identify which of the encryption/decryption cores within the crypto/cipher cores is employed to process the data. Thereafter, at 318, the output from the crypto/cipher cores is written out to the write buffer.

Figure 3C:
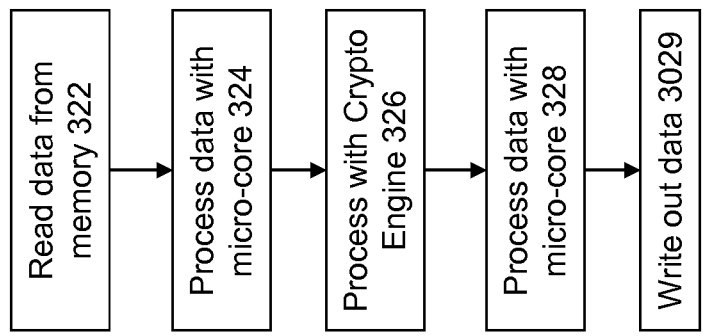

FIG. 3C illustrates an alternate flow that involves the micro-core 256 performing security processing in conjunction with the hardcoded crypto/cipher cores. The approach of FIG. 3C may be taken, for example, to have the micro-core execute pre-processing and post-processing of data in conjunction with encryption or decryption processing by the crypto/cipher cores. For example, this flow can be taken to decrypt an incoming data packet with the crypto/cipher cores, followed by authentication of that packet with the micro-core.

At 322, the input data is obtained from memory, including the control data and the packet payload data. At 324, the micro-core will perform the required processing on the packet payload data, generating an output which is then sent to the crypto/cipher cores. At 326, the data is processed by the appropriate core within the crypto/cipher cores. The control data from memory is used to identify which of the encryption/decryption cores within the crypto/cipher cores is employed to process the data. At 328, the micro-core is used again to process the output from the crypto/cipher cores. Thereafter, at 329, the output from the micro-core is written out to the write buffer.

Figure 3D:
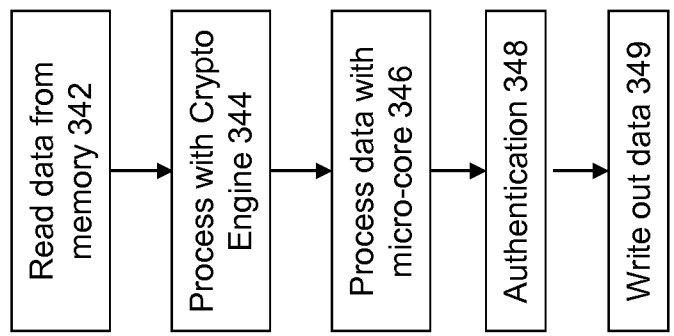

FIG. 3D illustrates another flow that involves the micro-core 256 performing security processing in conjunction with both the hardcoded crypto/cipher cores and the authentication cores, where the micro-core sits between the initial processing by the crypto/cipher cores and subsequent processing by the authentication cores. This flow may be taken, for example, to have the crypto/cipher cores decrypt a packet and to have the authentication cores authenticate the decrypted packet, but to use the micro-core to generate the key(s) that are used by the authentication cores to perform its authentication processing.

At 342, the input data is obtained from memory, including the control data and the packet payload data. At 344, the input data is processed by the appropriate core within the crypto/cipher cores. The control data from memory is used to identify which of the encryption/decryption cores within the crypto/cipher cores is employed to process the input data. At 346, the micro-core will perform its processing on the output from the crypto/cipher cores. The micro-core will generate an output which is directed to the authentication cores. At 348, a specified core in the authentication cores is used to perform hashing on the packet data. Thereafter, at 349, the output from the authentication cores is written to the write buffer.

Figure 3E:
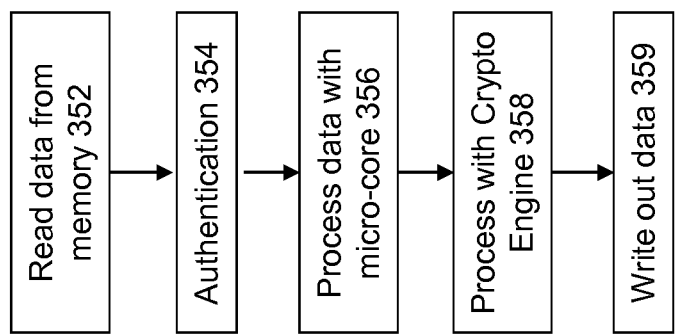

FIG. 3E illustrates a flow that that involves the reverse of the previous flow of FIG. 3D, where the flow of FIG. 3E has the micro-core between initial processing by the authentication cores and subsequent processing by the crypto/cipher cores. This flow may be taken, for example, to have the authentication cores first authenticate a packet, followed by the micro-core generating an encryption key for the packet, and then having the crypto/cipher cores use the key generated by the micro-core to encrypt the packet.

At 352, the input data is obtained from memory, including the control data and the packet payload data. At 354, a specified core in the authentication cores performs authentication processing on the packet data. Thereafter, at 356, the micro-core performs processing on the packet data. At 358, using the output from the micro-core, a specified core in the crypto/cipher cores performs encryption/decryption processing on the packet data. At 359, the output from the crypto/cipher cores is written out to the write buffer.

Figure 3F:
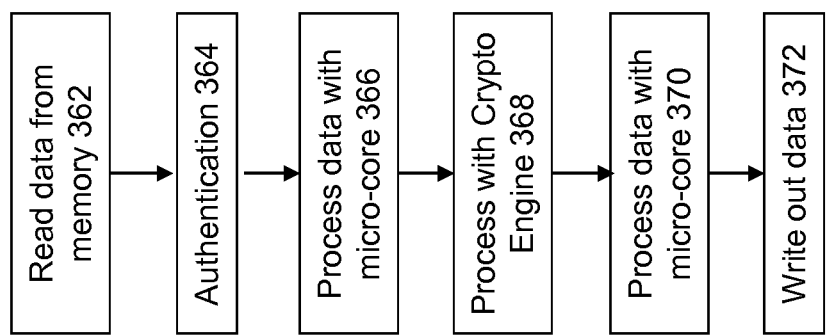

FIG. 3F illustrates another example flow that involves the micro-core at multiple stages of the flow in conjunction with processing by both the crypto/cipher cores and the authentication cores. At 362, the input data is obtained from memory. At 364, a specified core in the authentication cores performs authentication processing on the packet data. Thereafter, at 366, the micro-core performs processing on the packet data. At 368, using the output from the micro-core, a specified core in the crypto/cipher cores performs encryption/decryption processing on the packet data. The output from the crypto/cipher cores is processed by the micro-core at 370. Thereafter, at 372, the output from the micro-core is written out to the write buffer.

The security system disclosed herein may be used in conjunction with any appropriate processing system, such as the multi-core processing system 400 shown in FIG. 4. The multi-core processing system 400 includes a host processor 406 that includes multiple processor cores 408a-j. A multi-core processor is an integrated circuit that contains multiple microprocessor cores, which effectively multiplies the performance of the circuit in correspondence to the number of cores 408a-j. Therefore, the cores 408a-j shown in FIG. 4 correspond to conventionally understood microprocessor cores that are used to implement a multi-core processor. These cores 408a-j are distinguishable from the micro-core 456 that is used in security engine 402, which has a smaller layout footprint as compared to conventional processor cores 408a-j that are included as processing blocks within a larger integrated circuit.

Security engine 402, which is an example of security system 200 (FIG. 2), includes the combination of a micro-core 456 and multiple security cores 404a-n to perform security processing. To improve the performance of system 400, security-related processing is offloaded from the host processor 406 to the security engine 402. As discussed above, the security cores 404a-n include a fixed set of hardcoded functionality that relates to known protocols. The micro-core 456 is operable to extend the functionality of security engine 402 beyond the limited set of functions implicit within the circuitry of security cores 404a-n. The micro-core 456 within security engine 402 may be implemented as a programmable state machine capable of performing encryption/decryption and/or authentication processing on data packets. One or more instruction caches are used to hold programming logic for the micro-core 456s.

Data packets are received in system 400 through network interface(s) 416. Those data packets are stored into memory 430 as packet data 432. Memory 430 is also used to hold packet descriptors 434 and control descriptors 436. The packet descriptor 434 and control descriptor 436 generally correspond to security descriptors that contain pointers to data and control information, respectively, that are read from memory 430 to perform security processing by the security engine 402. The control descriptor 436 includes a pointer in memory 430 relating to the type of processing (e.g., encryption, description, authentication, and/or operation by micro-core or by hardcoded core) and any necessary keys. The packet descriptor 434 specifies information about the packet data, such as source address, destination address, data size, and location in a write buffer for processing results.

In operation, a core within host processor 406 sends a security descriptor message through a messaging network to the security engine 402 to initiate security processing. The packet descriptor 434 and/or control descriptor 436 are read from memory 430 and are processed by security engine 402 to allocate a combination of the micro-core 456 and/or one or more of the security cores 404a-n to parse the descriptor information. Using the descriptor information, the micro-core and/or selected core(s) within the security engine 402 determines: (a) the type of instruction(s) to be processed, including encryption/decryption and/or authentication type; (b) source address, destination address, and packet size; (c) packet data; and (d) identity of originator of the processing request. The micro-core and/or selected core(s) within the security engine 402 will then perform the requested operation (s) and write the output data to a write buffer in memory 430. Examples of performing requested operations are shown in FIGS. 3A-3F.

Further details regarding details of a networking system that may be used to implement the system 400 of FIG. 4 are described in U.S. patent application Ser. No. 13/107,809 filed May 13, 2011, entitled "IMPLEMENTING INTEGRATED NETWORKING FUNCTIONS AT WIRE SPEED", which is hereby expressly incorporated by reference in its entirety.

Figure 5:
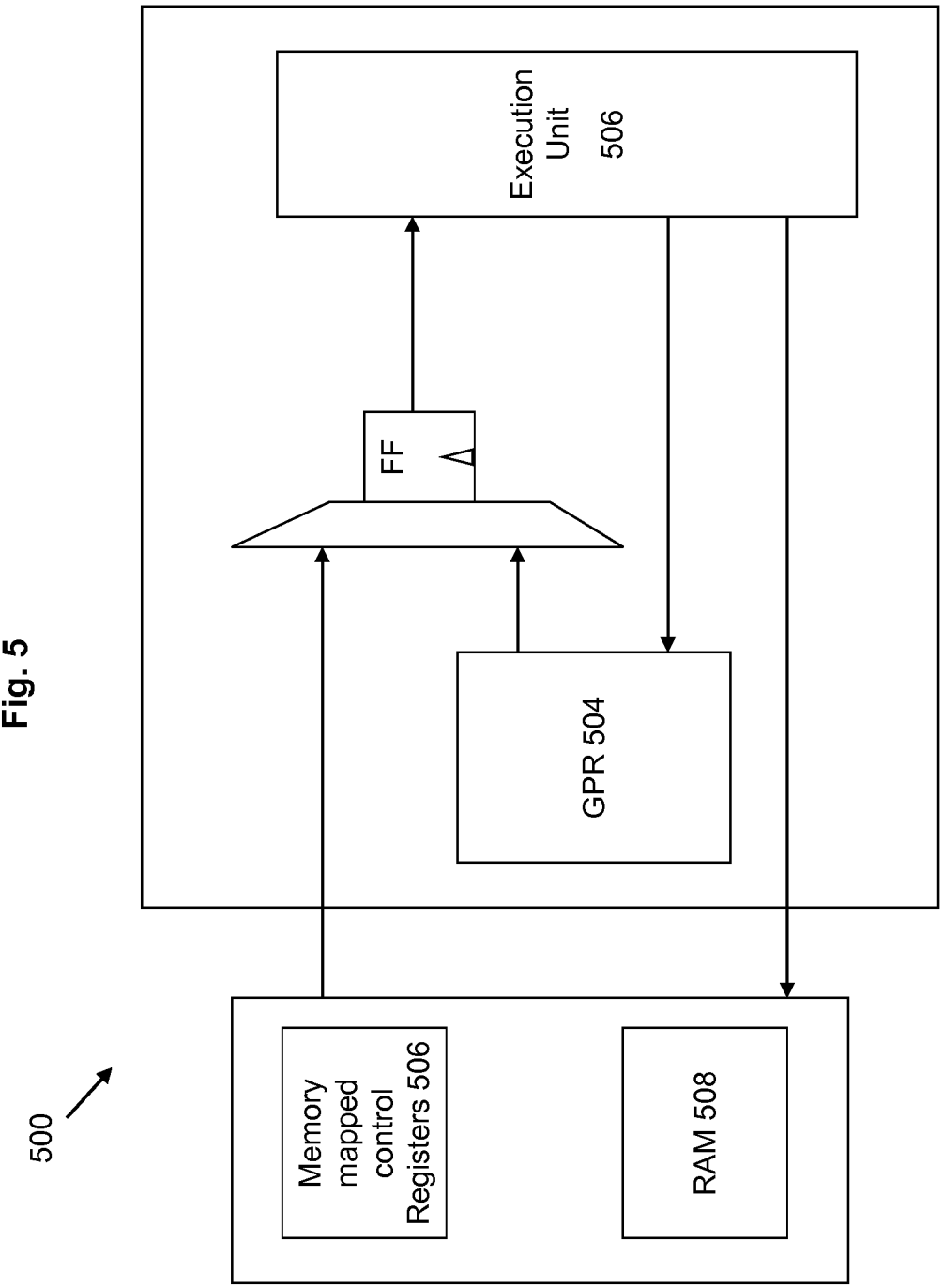
FIG. 5 illustrates an example architecture for a micro-core.

FIG. 5 shows a diagram of a micro-core architecture 500 according to some embodiments. The micro-core architecture 500 provides a framework that not only has a small silicon footprint, but also contains enough processing and expansion capability to support packet processing tasks for security applications. In some embodiments, the micro-core architecture 500 is compliant with standard and/or well known specifications and instruction sets. For example, the micro-core architecture 500 can be implemented to support the MIPS32 Release2 user space instruction set.

The micro-core architecture 500 in some embodiments is a five pipe stage, single issue 32-bit processor unit 506, which supports CISC-style enhanced instructions that perform simple ALU functions directly on data stored in memory as well as register files, and can write processing result either to the register file or memory. The memory and registers include a general purpose register (GPR) 504, as well as a RAM 508 that may be incorporated either as part of the micro-core or external to the micro-core. The registers within the micro-core may be used to communicate information to the micro-core about the current incoming packet. The registers may also be used by the micro-core to communicate specific tasks for downstream hardware to conduct on the current packet. A memory mapped control register 506 provides management and control functionality over the micro-core architecture 500. In some embodiments, the control register 506 and RAM 508 are not located within the micro-core itself.

The data is copied into the GPR 504 for processing by the execution unit 506. In some embodiments, the data is divided into multiple segments, e.g., where a register of 128 bits is divided into four segments of 32 bits each. This implementation for the micro-core provides for very efficient processing, since the packet data can therefore be operated upon on a segment basis. If some portion of the data is needed, the micro-core only needs to read in the necessary segment(s), modify or operate upon just that portion of the data, and then write it back to memory.

Therefore, what has been described is an approach for implementing a security processing system, where the security processing system includes one or more micro-cores that can operate in conjunction with one or more hardcoded security cores to process packets in a networking system. The micro-core can perform any suitably programmed tasks upon the packets, such as encryption/decryption and authentication tasks. The micro-core has great flexibility in its relative logical positioning within the security system, which allows the micro-core to operate with enough adaptability to handle current or future operating needs of the security system. This is in part because the micro-core can be programmed to access data anywhere within the security system, to operate upon that data as necessary, and then to inject the micro-core's data output anywhere within the data flows of the security system.

This means that the micro-core can be configured to handle protocol and processing needs without re-design of the hardware of the security system, even for protocols and processing needs that did not exist at the time of development or deployment for the security system. This approach of using a micro-core also allows the security system to address and implement bug-fixes for problems that may be discovered after the deployment of the security system.

The combination of having both the hard-coded security engines and the micro-core within the same system permits the security system to effectively obtain the best of both worlds, which includes the speed and performance advantages of having dedicated security plus the flexibility and expandability of having the micro-core.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A system for performing security processing, comprising:
   a first security circuit that is hardcoded with a first set of security functionality to address a first specific security protocol, and that has an input and an output;
   a second security circuit that is hardcoded with a second set of security functionality to address a second specific security protocol, and that has an input and an output;
   a micro-core that is programmable to implement a third set of security functionality, and that has an input and an output;
   a first multiplexer having a first input coupled to the output of the micro-core, and an output coupled to the input of the first security circuit;
   a memory having an output coupled to a second input of the first multiplexer and to the input of the micro-core;
   a second multiplexer having a first input coupled to the output of the first security circuit, a second input coupled to the output of the first multiplexer, a third input coupled to the output of the micro-core, and an output coupled to the input of the micro-core;
   a third multiplexer having a first input coupled to the output of the first multiplexer, a second input coupled to the output of the second multiplexer, a third input coupled to the output of the micro-core, and an output coupled to the input of the second security circuit;
   wherein the micro-core is configured to execute program code with deterministic latency.

2. The system of claim 1 in which the third set of security functionality comprises encryption, decryption, or authentication functions.

3. The system of claim 2 in which the micro-core is programmable to generate a key for the encryption, the decryption, or the authentication functions.

4. The system of claim 1 in which the micro-core is programmable to operate in conjunction with the first security circuit.

5. The system of claim 1 in which the micro-core is programmable to operate as a replacement for the first security circuit.

6. The system of claim 1 further comprising a multi-core processor, in which a core of the multi-core processor is configured to offload the first or third set of security functionality to the first security circuit or the micro-core, respectively.

7. The system of claim 1 further comprising a multi-core processor, in which a core of the multi-core processor is configured to offload the first and third set of security functionality to the security circuit or micro-core.

8. The system of claim 1 in which the system comprises a networking system.

9. The system of claim 1 in which the micro-core comprises a register to hold segmented data for the micro-core.

10. The system of claim 9 in which the segmented data is a unit of processing for the micro-core.

11. The system of claim 1 in which the memory comprises an instruction cache configured to hold instructions for the micro-core.

12. A method for performing security processing, comprising:
   in an integrated circuit including a first security circuit having an input and an output, a second security circuit having an input and an output, a micro-core having an input and an output, a memory having an output, and a plurality of signal source selecting circuits, each signal source selecting circuit configured to receive a plurality of input signals and to provide a selected one of the plurality of input signals as an output signal;
   receiving instructions, at the micro-core, to perform security processing;
   configuring a first signal selector circuit of the plurality of signal selector circuits to provide a signal pathway between a selected one of the memory output and the micro-core output, and the input of the first security circuit; p1 configuring a second signal selector circuit of the plurality of signal selector circuits to provide a signal pathway between a selected one of the first security circuit output and the micro-core output, and the input of the micro-core; and
   configuring a third signal selector circuit of the plurality of signal selector circuits to provide a signal pathway between a selected one of micro-core output and an output of the second signal selector circuit;
   wherein the first security circuit is hardcoded to perform a first set of security functionality to address a first specific security protocol; the local resources store at least program instructions for the micro-core, and the micro-core is programmable to perform a second set of security functionality, and performing the security processing by the micro-core is deterministic.

13. The method of claim 12 in which the micro-core performs encryption, decryption, or authentication functions.

14. The method of claim 13 in which the micro-core generates a key for the encryption, the decryption, or the authentication functions.

15. The method of claim 12 in which the micro-core is programmable to operate in conjunction with the first security circuit.

16. The method of claim 12 in which the micro-core is programmable to operate as a replacement for the first security circuit.

17. The method of claim 12 in which a core of a multi-core processor is configured to offload the first or second set of security functionality to the first security circuit or the micro-core.

18. The method of claim 12 in which a core of a multi-core processor is configured to offload the first and second set of security functionality to the first security circuit or the micro-core.

19. The method of claim 12 in which the micro-core operates on segmented data in a register.

20. The method of claim 19 in which the segmented data is a unit of processing for the micro-core.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,832,776 B1 | |
| APPLICATION NO. | : 13/164565 | |
| DATED | : September 9, 2014 | |
| INVENTOR(S) | : Revathi Natarajan | |

It is certified that error appears in the above-identified patent and that said Letters Patent is hereby corrected as shown below:

IN THE CLAIMS:

Column 10, line 41, please replace "circuit; p1 configuring" with --circuit; configuring--.

Signed and Sealed this
Thirteenth Day of January, 2015

Michelle K. Lee
*Deputy Director of the United States Patent and Trademark Office*